US012199369B2

(12) United States Patent
Wang

(10) Patent No.: US 12,199,369 B2
(45) Date of Patent: Jan. 14, 2025

(54) PIN CONNECTOR AND DISPLAY PANEL

(71) Applicant: WUHAN CHINA STAR OPTOELECTRONICS TECHNOLOGY CO., LTD., Wuhan (CN)

(72) Inventor: Dong Wang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/613,211

(22) PCT Filed: Oct. 11, 2021

(86) PCT No.: PCT/CN2021/122953
§ 371 (c)(1),
(2) Date: Nov. 22, 2021

(87) PCT Pub. No.: WO2023/029149
PCT Pub. Date: Mar. 9, 2023

(65) Prior Publication Data

US 2024/0047906 A1 Feb. 8, 2024

(30) Foreign Application Priority Data

Aug. 30, 2021 (CN) ......................... 202111001243.3

(51) Int. Cl.
*H01R 12/70* (2011.01)

(52) U.S. Cl.
CPC ................................ *H01R 12/7076* (2013.01)

(58) Field of Classification Search
CPC .... H01R 12/71; H01R 12/714; H01R 12/716; H01R 12/728; H01R 12/7082; H01R 13/64; H01R 13/642; H01L 24/06
See application file for complete search history.

(56) References Cited

U.S. PATENT DOCUMENTS

| | | | |
|---|---|---|---|
| 2010/0014222 A1 | 1/2010 | Hsu et al. | |
| 2018/0110125 A1 | 4/2018 | Abe et al. | |
| 2021/0059053 A1* | 2/2021 | Nakamura | G02F 1/1345 |
| 2023/0015549 A1* | 1/2023 | Cai | H10K 59/88 |

FOREIGN PATENT DOCUMENTS

| | | |
|---|---|---|
| CN | 101206323 A | 6/2008 |
| CN | 105957479 A | 9/2016 |
| CN | 206004084 U | 3/2017 |
| CN | 208521098 U | 2/2019 |
| CN | 109407425 A | 3/2019 |

(Continued)

*Primary Examiner* — Abdullah A Riyami
*Assistant Examiner* — Amara Anderson
(74) *Attorney, Agent, or Firm* — The Roy Gross Law Firm, LLC; Roy Gross

(57) ABSTRACT

A pin connector and a display panel are provided in the present application. The pin connector includes a plurality of pins arranged along a first direction, wherein the pins include a first pin for transmitting a first voltage, a second pin for transmitting a second voltage, and the first voltage is lower than the second voltage, wherein in the first direction, a space between the first pin and the second pin is not smaller than a size of three of the pins.

9 Claims, 4 Drawing Sheets

(56) References Cited

FOREIGN PATENT DOCUMENTS

| | | | | | |
|---|---|---|---|---|---|
| CN | 110096010 | A | | 8/2019 | |
| CN | 111445837 | A | | 7/2020 | |
| CN | 111602189 | A | | 8/2020 | |
| CN | 111653604 | A | * | 9/2020 | ............. G01R 31/40 |
| CN | 112467709 | A | | 3/2021 | |
| JP | 2010108931 | A | | 5/2010 | |
| KR | 20070063746 | A | | 6/2007 | |
| TW | 200607161 | A | | 2/2006 | |
| WO | 2019146011 | A1 | | 8/2019 | |
| WO | 2021258903 | A1 | | 12/2021 | |

* cited by examiner

PIN CONNECTOR AND DISPLAY PANEL

CROSS REFERENCE TO RELATED APPLICATIONS

This application is a National Phase of PCT Patent Application No. PCT/CN2021/122953 having International filing date of Oct. 11, 2021, which claims the benefit of priority of Chinese Application No. 202111001243.3 filed on Aug. 30, 2021. The contents of the above applications are all incorporated by reference as if fully set forth herein in their entirety.

FIELD DISCLOSURE

The present disclosure relates to the technical field of display, and in particular to the technical field of display panel manufacturing, and specifically relates to a pin connector and a display panel.

BACKGROUND OF DISCLOSURE

Transmission of signals in different components of electronic devices involve pins, and connection between lines on two components may be achieved by separately connecting the corresponding pins in the two components.

However, with the increasing of functions of electronic products, the number of pins is increased. When the multiple pins are shifted during a process of plugging the pins to a plurality of terminals on a display panel, since the size of a pin connector bearing the pins is fixed, it is not possible to add additional virtual pins between low-voltage pins and high-voltage pins to isolate the low-voltage pins from the high-voltage pins, so that the devices inside the display panel are burned by over-loaded voltage signals, eventually damaging the electronic products.

Therefore, in the plugging process of the existing pin connectors and display panels, there is a problem that the devices inside the display panel are burned by over-loaded voltage signals, and it is urgent to solve the problem above.

SUMMARY OF INVENTION

Technical Problems

The embodiments of the present disclosure provide a pin connector and a display panel to solve the problems that when the multiple pins are shifted during a process of plugging the pins to a plurality of terminals on a display panel, since the size of a pin connector bearing the pins is fixed, so that the devices inside the display panel are burned by over-loaded voltage signals.

Technical Solutions

The embodiments of the present disclosure provide a pin connector, including a plurality of pins arranged along a first direction, wherein the pins include:

a first pin for transmitting a first voltage;

a second pin for transmitting a second voltage, and the first voltage is lower than the second voltage;

wherein in the first direction, a space between the first pin and the second pin is not smaller than a size of three of the pins;

wherein the pins include a plurality of the first pins and a plurality of the second pins, and in the first direction, a space between the adjacent first pin and the second pin is not smaller than the size of three of the pins;

wherein in the first direction, a plurality of buffer areas arranged continuously are formed between the first pin and the second pin, and the pins are disposed in the buffer areas.

In an embodiment, the pins include:

a first pin group including the adjacent first pin and the second pin, and in the first pin group, a difference between the voltage transmitted by the first pin and the voltage transmitted by the second pin is a first difference;

a second pin group including the adjacent first pin and the second pin, and in the second pin group, a difference between the voltage transmitted by the first pin and the voltage transmitted by the second pin is a second difference, wherein the first difference is less than the second difference; and a space between the first pin and the second pin in the first pin group is smaller than a space between the first pin and the second pin in the second pin group.

In an embodiment, the pins include:

a third pin group including two of the adjacent first pins, and in the third pin group, a difference of the voltage transmitted between two of the first pins is a third difference;

a fourth pin group including two of the adjacent first pins, and in the fourth pin group, a difference of the voltage transmitted between two of the first pins is a fourth difference, wherein the third difference is less than the fourth difference; and a space between two of the first pins in the third pin group is smaller than a space between two of the first pins in the fourth pin group.

In an embodiment, the pins include:

a fifth pin group including two of the adjacent second pins, and in the fifth pin group, a difference of the voltage transmitted between two of the second pins is a fifth difference;

a sixth pin group including two of the adjacent second pins, and in the sixth pin group, a difference of the voltage transmitted between two of the second pins is a sixth difference, wherein the fifth difference is less than the sixth difference; and a space between two of the second pins in the fifth pin group is smaller than a space between two of the second pins in the sixth pin group.

In an embodiment, a part of or all the buffer areas is provided with the pins.

In an embodiment, the pins include:

a non-functional pin for floating; and a functional pin for transmitting voltage, and the buffer areas are provided with at least one of the non-functional pin and the functional pin.

The embodiments of the present disclosure provide a pin connector, including a plurality of pins arranged along a first direction, wherein the pins include:

a first pin for transmitting a first voltage;

a second pin for transmitting a second voltage, and the first voltage is lower than the second voltage;

wherein in the first direction, a space between the first pin and the second pin is not smaller than a size of three of the pins.

In an embodiment, the pins include: a plurality of the first pins and a plurality of the second pins, and in the first direction, a space between the adjacent first pin and the second pin is not smaller than the size of three of the pins.

In an embodiment, the pins include:

a first pin group including the adjacent first pin and the second pin, and in the first pin group, a difference between the voltage transmitted by the first pin and the voltage transmitted by the second pin is a first difference;

a second pin group including the adjacent first pin and the second pin, and in the second pin group, a difference between the voltage transmitted by the first pin and the voltage transmitted by the second pin is a second difference, wherein the first difference is less than the second difference; and a space between the first pin and the second pin in the first pin group is smaller than a space between the first pin and the second pin in the second pin group.

In an embodiment, the pins include:

a third pin group including two of the adjacent first pins, and in the third pin group, a difference of the voltage transmitted between two of the first pins is a third difference;

a fourth pin group including two of the adjacent first pins, and in the fourth pin group, a difference of the voltage transmitted between two of the first pins is a fourth difference, wherein the third difference is less than the fourth difference; and a space between two of the first pins in the third pin group is smaller than a space between two of the first pins in the fourth pin group.

In an embodiment, the pins include:

a fifth pin group including two of the adjacent second pins, and in the fifth pin group, a difference of the voltage transmitted between two of the second pins is a fifth difference;

a sixth pin group including two of the adjacent second pins, and in the sixth pin group, a difference of the voltage transmitted between two of the second pins is a sixth difference, wherein the fifth difference is less than the sixth difference; and a space between two of the second pins in the fifth pin group is smaller than a space between two of the second pins in the sixth pin group.

In an embodiment, in the first direction, a plurality of buffer areas arranged continuously are formed between the first pin and the second pin, and the pins are disposed in the buffer areas.

In an embodiment, a part of or all the buffer areas is provided with the pins.

In an embodiment, the pins include:

a non-functional pin for floating; and a functional pin for transmitting voltage, and the buffer areas are provided with at least one of the non-functional pin and the functional pin.

The embodiments of the present disclosure provide a display panel including a terminal area, wherein a plurality of terminals are provided in the terminal area, the terminals are arranged along a second direction, and the terminals include:

a first terminal for transmitting a first voltage;

a second terminal for transmitting a second voltage, and the first voltage is lower than the second voltage;

wherein in the second direction, a space between the first terminal and the second terminal is not smaller than a size of three of the terminals.

In an embodiment, the terminals include a plurality of the first terminals and a plurality of the second terminals; and in the second direction, a space between the adjacent first terminal and the second terminal is not smaller than the size of three of the terminals.

In an embodiment, the terminals include:

a first terminal group including the adjacent first terminal and the second terminal, and in the first terminal group, a difference between the voltage transmitted by the first terminal and the voltage transmitted by the second terminal is a seventh difference;

a second terminal group including the adjacent first terminal and the second terminal, and in the second terminal group, a difference between the voltage transmitted by the first terminal and the voltage transmitted by the second terminal is an eighth difference, wherein the seventh difference is less than the eighth difference; and a space between the first terminal and the second terminal in the first terminal group is smaller than a space between the first terminal and the second terminal in the second terminal group.

In an embodiment, the terminals include:

a third terminal group including two of the adjacent first terminals, and in the third terminal group, a difference of the voltage transmitted between two of the first terminals is a ninth difference;

a fourth terminal group including two of the adjacent first terminals, and in the fourth terminal group, a difference of the voltage transmitted between two of adjacent first terminals is a tenth difference, wherein the ninth difference is less than the tenth difference; and a space between two of the first terminals in the third terminal group is smaller than a space between two of the first terminals in the fourth terminal group.

In an embodiment, the terminals include:

a fifth terminal group including two of the adjacent second terminals, and in the fifth terminal group, a difference of the voltage transmitted between two of the second terminals is an eleventh difference;

a sixth terminal group including two of the adjacent second terminals, and in the sixth terminal group, a difference of the voltage transmitted between two of the second terminals is a twelfth difference, wherein the eleventh difference is less than the twelfth difference; and a space between two of the second terminals in the fifth terminal group is smaller than a space between two of the second terminals in the sixth terminal group.

In an embodiment, in the second direction, a plurality of terminal buffer areas arranged continuously are formed between the first terminal and the second terminal, and the pins are disposed in the buffer areas.

Beneficial Effect

The present disclosure provides a pin connector and a display panel, wherein the pin connector includes a plurality of pins arranged along a first direction. The pins include: a first pin for transmitting a first voltage; a second pin for transmitting a second voltage, and the first voltage is lower than the second voltage; wherein in the first direction, a space between the first pin and the second pin is not smaller than a size of three of the pins. By defining the space between the first pin and the second pin having voltage difference to be the size not smaller than three of the pins, there is a large enough space between two of the pins transmitting different voltages, and thus a problem of damage to internal devices of the display panel caused by shift of the pins in the process of plugging the pins to the terminals on the display panel can be improved.

BRIEF DESCRIPTION OF DRAWINGS

The technical solutions and other beneficial effects of the present disclosure will be obvious by the detailed description of specific embodiments of the disclosure in combination with accompanying drawings as below.

DETAILED DESCRIPTION OF EMBODIMENTS

The technical solutions in the embodiments of the present disclosure are clearly and completely described in the following description, which is combined with the drawings in the embodiments of the present disclosure. Obviously, the embodiments described in the following description are only a part of the embodiments of the disclosure, not all the embodiments. Other embodiments obtained from those skilled in the art based on the embodiments of the present disclosure without paying any inventive effort belong to a protected scope of the present disclosure.

In the description of the present disclosure, the terms “first” and “second” are used for differentiating different objects, not describing a specific sequence. Moreover, the terms “include”, “comprise”, and any variant thereof are intended to cover a non-exclusive inclusion. For example, the processes, methods, systems, products, or apparatuses including a series of steps or modules do not limit in the listed steps and modules, and optionally further include non-listed steps and modules, or optionally further include other steps and modules inherent to the processes, methods, products, and apparatuses.

The “embodiment” described herein means the specific features, structures, or properties described in connection with embodiments may be included in at least one embodiment of the present disclosure. The phrase appearing in various places in the specification does not necessarily mean the same embodiment, nor is it a separate or alternative embodiment that is mutually exclusive with other embodiments. It is obviously and implicitly understood by those skilled in the art that the embodiments described herein may be in combination with other embodiments.

The embodiments of the present disclosure provide a pin connector. The pin connector is included but not limited to the following embodiments and a combination of the following embodiments.

Figure 1:
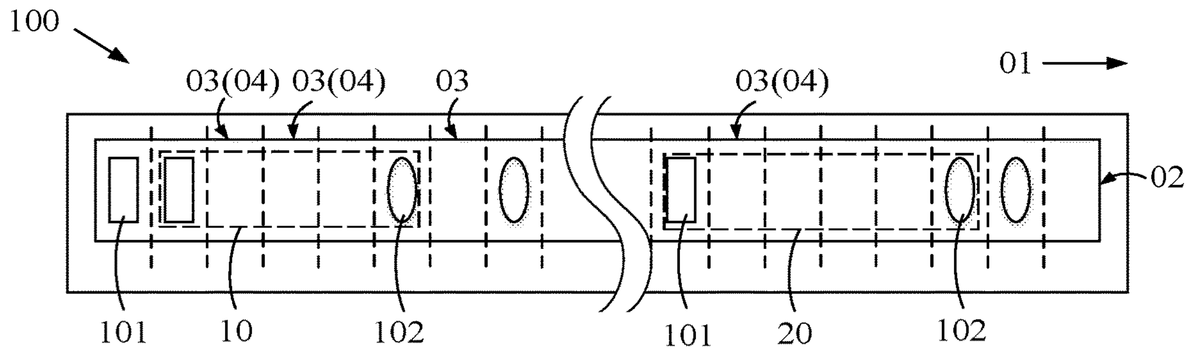
FIG. 1 is a layout view of a plurality of pins in a first pin connector provided by an embodiment of the present disclosure.

In an embodiment, as shown in FIG. 1, the pin connector 100 includes a plurality of pins arranged along a first direction 01. The pins include a first pin 101 for transmitting a first voltage; a second pin 102 for transmitting a second voltage, and the first voltage is lower than the second voltage; wherein in the first direction 01, a space between the first pin 101 and the second pin 102 is not smaller than a size of three of the pins.

Specifically, the pin connector 100 may include a pin area 02. The pin area 02 may be composed of a plurality of unit areas 03 arranged along the first direction 01. Further, the unit areas 03 may be provided connected in the first direction 01. For ease of expression here, the unit areas 03 may be named as pin_1, pin_2, . . . , pin_N from left to right, wherein the N is a positive integer. One of the first pins 101 may be the pin located in pin_m, one of the second pins 102 may be the pin located in pin_n, wherein the m is not equal to n. The number of the first pin 101 may be greater than or equal to 1, and the number of the second pin 102 may also be greater than or equal to 1.

Understandably, when the number of the first pin 101 and the number of the second pin 102 equal to 1, it is equivalent that the pins for inputting different voltages in the pins only include one first pin 101 and one second pin 102, and other pins may be used for floating, which means other pins are not used for transmitting voltage. Furthermore, if a space between the first pin 101 and the second pin 102 is defined to be not smaller than the size of three of the pins in the first direction 01, and the space between the first pin 101 and the second pin 102 is further reasonably defined, the problem of damage to internal devices of the display panel caused by shift of the pins in the process of plugging the pins to a plurality of terminals on the display panel can be solved.

Understandably, when either of the number of the first pin 101 and the number of the second pin 102 is greater than 1, it is equivalent that the pins at least include two first pins 101 and one second pin 102, or include one first pin 101 and two second pins 102. Furthermore, if the space between the first pin 101 and the second pin 102 is defined to be not smaller than the size of three of the pins in the first direction 01, and the space between the first pin 101 and the second pin 102 is further reasonably defined, at least the problem of damage to internal devices connecting the first pin 101 and the second pin 102 caused by shift of a plurality of lines of external components and the corresponding pins 10 during connection can be solved. Even in this way, certainly and integrally, the problem of damage to internal devices of the display panel caused by shift of the pins in the process of plugging the pins to the terminals on the display panel may also be solved.

In an embodiment, as shown in FIG. 1, the pins include a plurality of the first pins 101 and a plurality of the second pins 102, and in the first direction 01, a space between the adjacent first pin 101 and the second pin 102 is not smaller than the size of three of the pins.

The first voltages transmitted by the first pins 101 may be the same or different, and the second voltages transmitted by the second pins 102 may be the same or different. Understandably, whether the first voltages are the same or not and whether the second voltages are the same or not, due to the first voltage being lower than the second voltage, the voltage transmitted by the adjacent first pins 101 is different from the voltage transmitted by the adjacent second pins 102. When the number of the first pins 101 and the number of the second pins 102 are greater than 1, if the space between the adjacent first pin 101 and the second pin 102 is not smaller than the size of three of the pins, it is ensured that the space between any of the first pins 101 and any of the second pins 102 is not smaller than the size of three of the pins. Further, the space between the first pin 101 and the second pin 102 is reasonably defined, so that the problem of damage to internal devices of the display panel caused by shift of the pins in the process of plugging the pins to the terminals on the display panel can be solved.

In an embodiment, as shown in FIG. 1, the pins include: a first pin group 10 including the adjacent first pin 101 and the second pin 102, and in the first pin group 10, a difference between the voltage transmitted by the first pin 101 and the voltage transmitted by the second pin 102 is a first difference; a second pin group 20 including the adjacent first pin 101 and the second pin 102, and in the second pin group 20, a difference between the voltage transmitted by the first pin 101 and the voltage transmitted by the second pin 102 is a second difference, wherein the first difference is less than the second difference; and a space between the first pin 101 and the second pin 102 in the first pin group 10 is smaller than a space between the first pin 101 and the second pin 102 in the second pin group 20.

The first pin 101 and the second pin 102 in the first pin groups 10 are not the first pin 101 and the second pin 102 in the second pin group 20 at the same time, which means the first pin 101 in the first pin group 10 may be the first pin 101 in the second pin group 20 or the second pin 102 in the first pin group 10 may be the second pin 102 in the second pin group 20. Understandably, due to the first difference being less than the second difference, which means the difference of the voltage transmitted by the first pin 101 and the second pin 102 in the first pin group 10 is great. Under the premise of the space between the adjacent first pin and the second pin in the present embodiment being not smaller than the size of three of the pins, the space between the first pin 101 and the second pin 102 in the first pin group 10 are further defined to be smaller than the space between the first pin 101 and the second pin 102 in the second pin group 20. According to the difference transmitted by the adjacent first pin 101 and the second pin 102 in the pin groups, the space between the adjacent first pin 101 and the second pin 102 in the pin groups may be reasonably defined, so that the problem of damage to internal devices of the display panel caused by shift of the pins in the process of plugging the pins to the terminals on the display panel can be solved.

Figure 2:
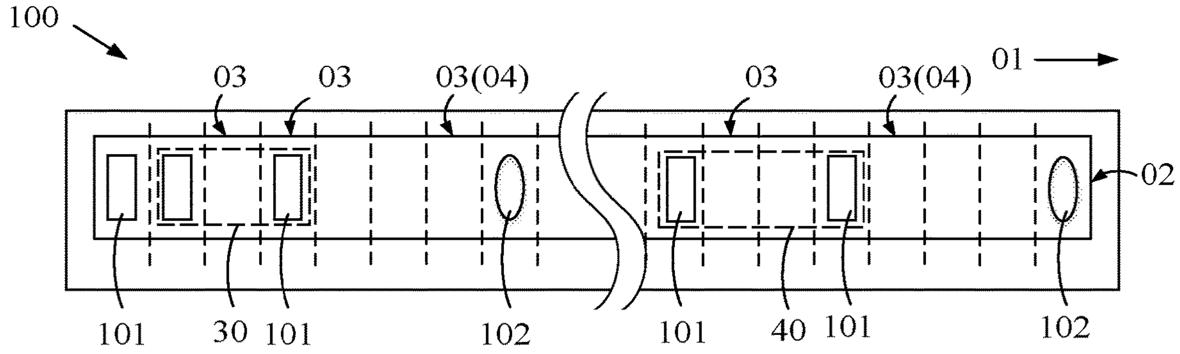
FIG. 2 is a layout view of a plurality of pins in a second pin connector provided by an embodiment of the present disclosure.

In an embodiment, as shown in FIG. 2, the pins include: a third pin group 30 including two of the adjacent first pins 101, and in the third pin group 30, a difference of the voltage transmitted between two of the first pins 101 is a third difference; a fourth pin group 40 including two of the adjacent first pins 101, and in the fourth pin group a difference of the voltage transmitted between two of the first pins 101 is a fourth difference, wherein the third difference is less than the fourth difference; and a space between two of the first pins 101 in the third pin group 30 is smaller than a space between two of the first pins 101 in the fourth pin group 40.

Based on the above description, it is known that the first voltages transmitted by the first pins 101 may be different. Compared with the first pin group 10 and the second pin group 20, the third pin group 30 and the fourth pin group 40 in the present embodiment are taken from the first pins 101. Similarly, the two of the first pins 101 in the third pin group 30 and the two of the first pins 101 in the fourth pin group 40 may be partly identical, but not all identical. Similarly, according to the difference of the voltage transmitted by two of the adjacent first pins 101 in the pin groups, the space between two of the adjacent first pins 101 in the pin groups may be reasonably defined, so that the problem of damage to internal devices of the display panel caused by shift of the pins in the process of plugging the pins to the terminals on the display panel can be solved.

Figure 3:
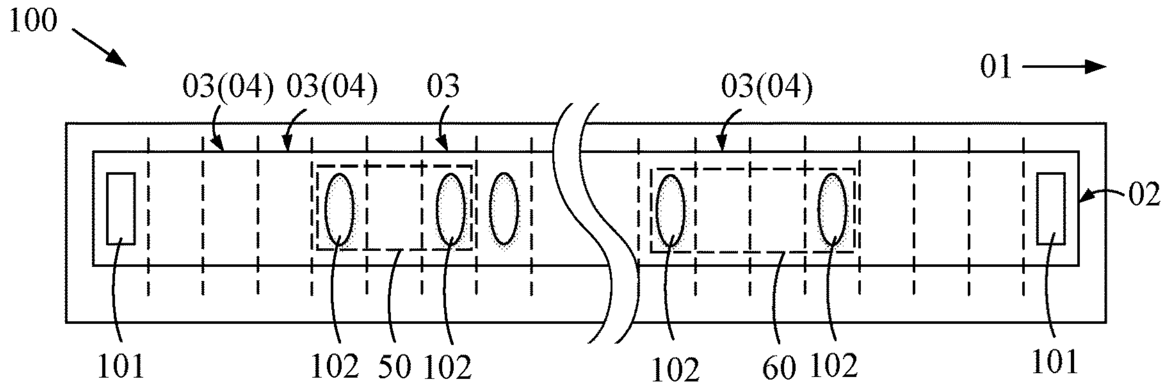
FIG. 3 is a layout view of a plurality of pins in a third pin connector provided by an embodiment of the present disclosure.

In an embodiment, as shown in FIG. 3, the pins include: a fifth pin group 50 including two of the adjacent second pins 102, and in the fifth pin group 50, a difference of the voltage transmitted between two of the second pins 102 is a fifth difference; a sixth pin group 60 including two of the adjacent second pins 102, and in the sixth pin group, a difference of the voltage transmitted between two of the second pins 102 is a sixth difference, wherein the fifth difference is less than the sixth difference; and a space between two of the second pins 102 in the fifth pin group 50 is smaller than a space between two of the second pins 102 in the sixth pin group 60.

Based on the above description, it is known that the first voltages transmitted by the second pins 102 may be different. Compared with the first pin group 10 and the second pin group 20, the fifth pin group 50 and the sixth pin group 60 in the present embodiment are taken from the second pins 102. Similarly, the two of the second pins 102 in the fifth pin group 50 and the two of the second pins 102 in the sixth pin group 60 may be partly identical, but not all identical. Similarly, according to the difference of the voltage transmitted by the two of the adjacent second pins 102 in the pin groups, the space between the two of the adjacent second pins 102 in the pin groups may be reasonably defined, so that the problem of damage to internal devices of the display panel caused by shift of the pins in the process of plugging the pins to the terminals on the display panel can be solved.

In summary, for the pins, every two of the pins for transmitting the voltage may be divided into one pin group. According to the difference of the voltage transmitted by the two of the adjacent pins in the pin groups, the space between the two of the corresponding second pins 102 in the pin groups may be further reasonably defined, so that the problem of damage to internal devices of the display panel caused by shift of the pins in the process of plugging the pins to the terminals on the display panel can be further solved.

Specifically, the two pins in each pin group have corresponding combined values. The combined values are ratios of a voltage difference to a number value, the voltage difference is an absolute value of the difference of the voltage transmitted between the corresponding two pins, and the number value is a ratio of the space between the corresponding two pins in the first direction 01 to the size of the pins, wherein the combined value corresponding to the two pins in each of the pin group is not greater than a combined threshold. Understandably, the combined threshold can be understood as a maximum value of the combined value. Specifically, when the combined value is greater than the combined threshold, it can be considered that the absolute value of the difference of the voltage transmitted by the corresponding two pins should theoretically have a large safety voltage difference relative to the number value actual corresponding to the two pins. Alternatively, it can be considered that the space between the corresponding two pins should theoretically have a small number value relative to the absolute value of the difference of the voltages transmitted by the corresponding two pins, resulting in the problem of damage to internal devices of the display panel caused by shift of the pins 10 during connection.

In summary, the combined threshold is a critical number of the corresponding combined value that the internal devices of the display panel will not be or will be damaged when the pin connector and the display panel are shifted during the plugging process. Specifically, herein, it is illustrated and exemplified that in the first direction 01, the space between the adjacent first pin 101 and the second pin 102 is not smaller than the size of three of the pins, and the combined threshold is 9. For example, if the voltage difference corresponding to the first pin 101 and the second pin 102 is 27V, the corresponding number value is not less than 3.

Further, the combined value corresponding to any of the first pins 101 and any of the second pins 102 is not greater than the combined threshold, the combined value corresponding to any two of the first pins 101 is not greater than the combined threshold, and the combined value corresponding to the any two of the second pins 102 is not greater than the combined threshold. Specifically, for the first pin 101 and the second pin 102 with a small voltage difference, according to the corresponding combined threshold, the space between the first pin 101 and the second pin 102 may be defined small as well. For the first pin 101 and the second pin 102 with a great voltage difference, according to the corresponding combined threshold, the space between the first pin 101 and the second pin 102 may be defined great as well. Similarly, the spaces between any two of the first pins 101 and any two of the second pins 102 can also refer to the above defining manner.

In an embodiment, as shown in FIGS. 1-3, in the first direction 01, a plurality of buffer areas 04 arranged continuously are formed between the first pin 101 and the second pin 102, and the pins are disposed in the buffer areas 04. The buffer areas 04 can be understood as a plurality of unit areas 03 located between the corresponding first pin 101 and the corresponding second pin 102. Understandably, based on the above description, each of the pins is located in the corresponding buffer area 04. For ease of description, it can also be understood that the space between the first pin 101 and the second pin 102 is not smaller than the size of three of the buffer areas 04. Understandably, a distance between the adjacent first pin 101 and the second pin 102 is appropriately increased by forming the buffer areas 04 arranged continuously between the first pin 101 and the second pin 102. When the pins are shifted during the process of plugging the pins to the terminals on the display panel, the terminals that should originally be loaded with the second voltage in the display panel can be shifted to the buffer area 04 where the pins are not defined. That is, the probability of plugging the terminals that should originally be loaded with the second voltage to the pins for inputting the first voltage is reduced, and thus the probability of the damage to the internal devices of the display can be reduced.

In an embodiment, a part of or all the buffer areas 04 is provided with the pins. Specifically, each of the buffer areas 04 can be provided with or not provided with one of the pins, as long as the space between the first pin 101 and the second pin 102 is not smaller than the size of three of the pins.

In an embodiment, as shown in FIGS. 4-7, the pins include: a non-functional pin 103 for floating; and a functional pin 104 for transmitting voltage, and the buffer areas 04 are provided with at least one of the non-functional pin 103 and the functional pin 104. The non-functional pin 103 can be understood as the pins not transmitting signals, which means the electric signals are not transmitted in the lines connected to the non-functional pin 103, or the non-functional pin 103 only binds to the corresponding pin on the display panel but does not transmit signals. With reference to FIGS. 4-7, which are schematic views of arrangements of the adjacent first pin 101, the second pin 102, and the pins between both of them.

Figure 4:
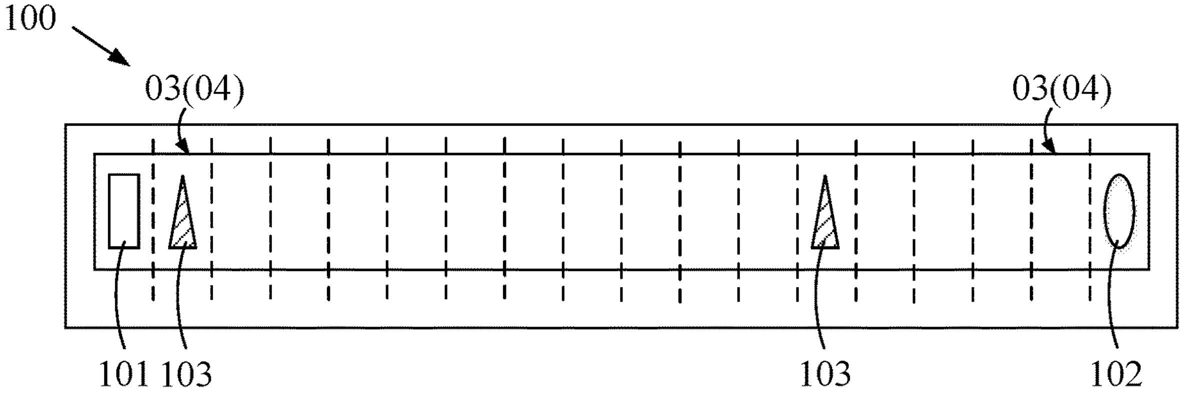
FIG. 4 is a layout view of a plurality of pins in a fourth pin connector provided by an embodiment of the present disclosure.
Figure 5:
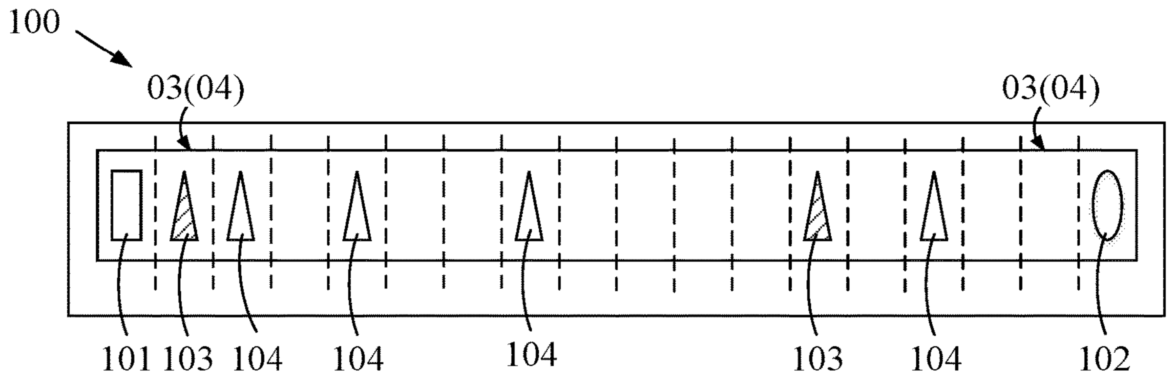
FIG. 5 is a layout view of a plurality of pins in a fifth pin connector provided by an embodiment of the present disclosure.

Specifically, as shown in FIGS. 4 and 5, at least one of the non-functional pins 103 is provided in at least one of the buffer areas 04. Understandably, when the pin connector 100 is bonded with the display panel, the non-functional pin 103 is provided in at least one of the buffer areas 04. Furthermore, upon reducing the damage to the internal devices of the display panel caused by shift of the pins in the process of plugging the pins to the terminals on the display panel, by covering the non-functional pin 103 not transmitting any signals on a partial region of a substrate, high temperature and high voltage are also prevented from directly affecting on the substrate used for providing of the non-functional pin 103 in the pin connector 100, so that the damage to the pin connector 100 caused by the high temperature and high voltage is reduced.

Figure 6:
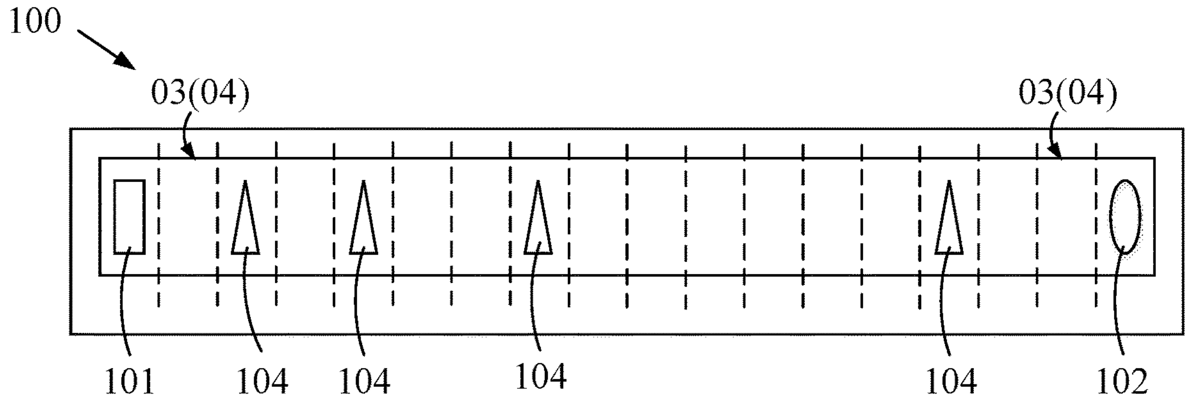
FIG. 6 is a layout view of a plurality of pins in a sixth pin connector provided by an embodiment of the present disclosure.

Specifically, as shown in FIGS. 5 and 6, at least one of the functional pins 104 is provided in the at least of the buffer areas 04. It is noted that the first pin 101, the second pin 102, and the functional pin 104 are used to transmit voltage. That is, a plurality of lines of external components can be connected to the first pin 101, the second pin 102, and the functional pin 104 to transmit the corresponding signals to the internal devices of the display panel. Understandably, the functional pin 104 for transmitting voltage provided between the first pin 101 and the second pin 102 can increase the number of the pins for transmitting signals in the pin areas 02, and improve the utilization of signal transmission in the pin connector 100. Further, the functional pin 104 can also be provided in each of the buffer areas 04, and the utilization of signal transmission in the pin connector 100 is further improved. Further, at least one of the functional pins 104 can be used for grounding. It should be noted that the size of the functional pin 104 for grounding is generally larger than the size of other functional pins. In this way, on the basis of improving the utilization of signal transmission in the pin connector 100, the risk of damage to internal devices of the display panel caused by shift of the pins in the process of plugging the pins to the terminals on the display panel can be further reduced.

The voltage transmitted by the functional pin 104 may or may not be in a range of the first voltage or a range of the second voltage since a selection manner of the first pin 101 and the second pin 102 is not unique. It is noted that the present embodiment is based on one of the first pins 101 and one of the second pins 102, and the functional pin 104 for transmitting voltage is provided between the first pin 101 and the second pin 102.

Specifically, when the voltage transmitted by one of the functional pins 104 is within the range of the first voltage or the range of the second voltage, which means the first pin 101 and the second pin 102 as premise are not provided adjacent, and it also means the functional pin 104 may be selected as the first pin 101 or the second pin 102 in other groups. Furthermore, in the first direction 01, the space between the first pin 101 and the functional pin 104 is not smaller than the size of three of the pins, and the space between the second pin 102 and the functional pin 104 is not smaller than the size of the of three of the pins. Further, when the voltage transmitted by at least two of the functional pins 104 is within the range of the first voltage or the range of the second voltage, similarly, in the first direction 01, the space between any two of the functional pins 104 is not smaller than the size of three of the pins.

Further, based on the above description, it is known that the combined value corresponding to any of the first pins 101 and any of the second pins 102 is not greater than the combined threshold. Therefore, in the present embodiment, in the first pins 101, all the functional pins 104, and the second pins 102, a combined value corresponding to any two of the pins may not be greater than the combined threshold.

Specifically, when the voltage transmitted by one of the functional pins 104 is not within the range of the first voltage or the range of the second voltage, which means the first pin 101 and the second pin 102 as premise are provided adjacent. Furthermore, in the first pin 101, all of the functional pins 104, and the second pin 102, the combined value corresponding to any two of the pins may not be greater than the combined threshold.

Figure 7:
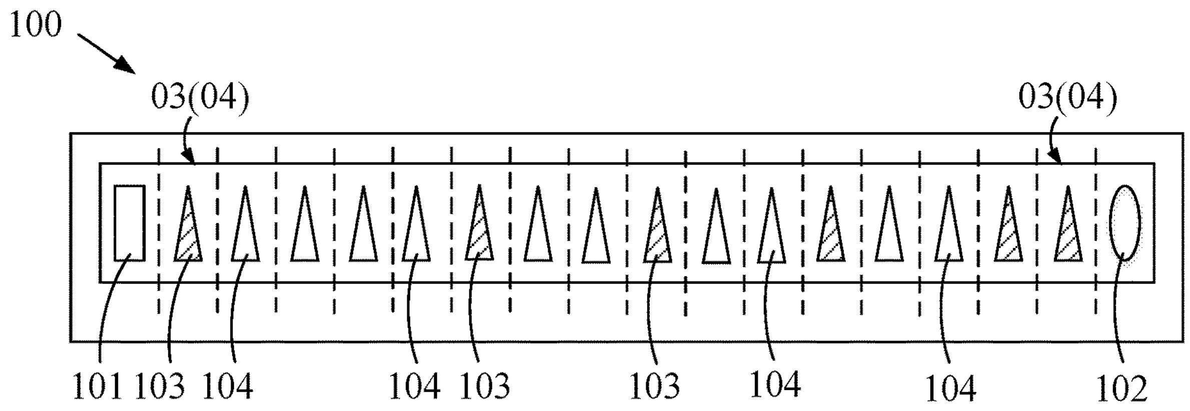
FIG. 7 is a layout view of a plurality of pins in a seventh pin connector provided by an embodiment of the present disclosure.

Specifically, as shown in FIG. 7, the functional pin 104 or the non-functional pin 103 are provided in each of the buffer areas 04. Based on the above description, when the pin connector is bonded with the display panel, since the functional pin 104 or the non-functional pin 103 are provided in each of the buffer areas 04, the area of direct contact between the substrate and the display panel can be minimized. Similarly, the damage to the pin connector 100 caused by the high temperature and high voltage can be further reduced. Even further, each of the unit areas 03 can be provided with one of the pins, and the damage to the pin connector 100 caused by the high temperature and high voltage can be even further reduced.

Further, the buffer areas 04 arranged continuously are also formed in two of the first pins 101 for transmitting different voltage, and the buffer areas 04 arranged continuously are also formed in two of the second pins 102 for transmitting different voltage. Specifically, a providing manner of the pins located in the buffer areas 04 between the two of the first pins 101 for transmitting different voltage, and a providing manner of the pins located in the buffer areas 04 between the two of the second pins 101 for transmitting different voltage can refer to the providing manners referring to the pins located in the buffer areas 04 between the first pin 101 and the second pin 102 in the above description.

The embodiments of the present disclosure further provide a display panel including a terminal area, a plurality of terminals are provided in the terminal area, and the terminals are arranged along a second direction. The terminals include a first terminal for transmitting a first terminal voltage; a second terminal for transmitting a second terminal voltage, and the first terminal voltage is lower than the second terminal voltage; wherein in the second direction, a space between the first terminal and the second terminal is not smaller than a size of three of the terminals.

Specifically, the terminals in the display panel, the second direction, the first terminal, and the second terminal can be based on the display panel, and refer to the relating description of the pins, the first direction, the first pins, and the second pins in the pin connector as described above.

Specifically, the display panel can be used to electrically connect any of the pin connectors as described above or external lines. When the display panel is used to electrically connect any of the pin connectors described above, the pin connector can include a plurality of input pins, and a providing manner of the input pins can refer to the providing manner of the pins described above. It is noted that the pins in the display panel can correspond and connect a plurality of output ends in the pin connector one by one.

In an embodiment, the pins include a plurality of the first terminals and a plurality of the second terminals; and in the second direction, a space between the adjacent first terminal and the second terminal is not smaller than the size of three of the terminals. Based on the above description, it is known that when the pins in the pin connector are provided as above, the corresponding pins in the display panel should also be provided as described in any of the embodiments. That is, the space between the first pin and the second pin is reasonably defined, so that the problem of damage to internal devices of the display panel caused by shift of the pins in the process of plugging the pins to the terminals in the terminal areas in the display panel is solved.

In an embodiment, the pins include: a first terminal group including the adjacent first terminal and the second terminal, and in the first terminal group, a difference between the voltage transmitted by the first terminal and the voltage transmitted by the second terminal is a seventh difference; a second terminal group including the adjacent first terminal and the second terminal, and in the second terminal group, a difference between the voltage transmitted by the first terminal and the voltage transmitted by the second terminal is an eighth difference, wherein the seventh difference is less than the eighth difference, and a space between the first terminal and the second terminal in the first terminal group is smaller than a space between the first terminal and the second terminal in the second terminal group.

In an embodiment, the terminals include a third terminal group including two of the adjacent first terminals, and in the third terminal group, a difference of the voltage transmitted between two of the first terminals is a ninth difference; a fourth terminal group including two of the adjacent first terminals, and in the fourth terminal group, a difference of the voltage transmitted between two of the adjacent first terminals is a tenth difference, wherein the ninth difference is less than the tenth difference, and a space between two of the first terminals in the third terminal group is smaller than a space between two of the first terminals in the fourth terminal group.

In an embodiment, the terminals include a fifth terminal group including two of the adjacent second terminals, and in the fifth terminal group, a difference of the voltage transmitted between two of the second terminals is an eleventh difference; a sixth terminal group including two of the adjacent second terminals, and in the sixth terminal group, a difference of the voltage transmitted between two of the second terminals is a twelfth difference, wherein the eleventh difference is less than the twelfth difference; and a space between two of the second terminals in the fifth terminal group is smaller than a space between two of the second terminals in the sixth terminal group.

In an embodiment, in the second direction, a plurality of terminal buffer areas arranged continuously are formed between the first terminal and the second terminal, and the pins are disposed in the buffer areas.

The present disclosure provides a pin connector and a display panel. The pin connector includes a plurality of pins arranged along a first direction, wherein the pins include a first pin for transmitting a first voltage; a second pin for transmitting a second voltage, and the first voltage is lower than the second voltage; wherein in the first direction, a space between the first pin and the second pin is not smaller than a size of three of the pins. By defining the space between the first pin and the second pin having voltage difference to be the size not smaller than three of the pins in the present disclosure, there is a large enough space between two of the pins transmitting different voltages, and thus a problem of damage to internal devices of the display panel caused by shift of the pins in the process of plugging the pins to the terminals on the display panel can be improved.

The pin connector and the display panel provided by the embodiments of the present disclosure are described in detail as above. The principles and embodiments of the present disclosure are described in the specific examples.

The description of the embodiments is only for helping understand the technical solutions and its core idea of the present disclosure. It should be understood by those skilled in the art that they can still modify the technical solutions described in the above embodiments or equivalently replace some of the technical features, and these modifications or replacements do not depart from the scope of the technical solutions of the embodiments of the present disclosure.

What is claimed is:

1. A pin connector, comprising a plurality of pins arranged along a first direction, wherein the pins comprise:

one or more first pins each for transmitting a first voltage;

one or more second pins each for transmitting a second voltage, and the first voltage is lower than the second voltage;

in the first direction, each of ones of the one or more first pins is adjacent to a corresponding one of the one or more second pins, a space between each of the ones of the one or more first pins and the corresponding one of the one or more second pins is not smaller than a size of three of the pins;

wherein in the first direction, a plurality of buffer areas arranged continuously are formed between the first pin and the second pin, and each of ones of the plurality of buffer areas is not provided with one of the pins.

2. The pin connector as claimed in claim 1, wherein the pins comprise:

a first pin group comprising the adjacent first pin and the second pin, and in the first pin group, a difference between the voltage transmitted by the first pin and the voltage transmitted by the second pin is a first difference;

a second pin group comprising the adjacent first pin and the second pin, and in the second pin group, a difference between the voltage transmitted by the first pin and the voltage transmitted by the second pin is a second difference, wherein the first difference is less than the second difference; and a space between the first pin and the second pin in the first pin group is smaller than a space between the first pin and the second pin in the second pin group.

3. The pin connector as claimed in claim 1, wherein the pins comprise:

a third pin group comprising two of the adjacent first pins, and in the third pin group, a difference of the voltage transmitted between two of the first pins is a third difference;

a fourth pin group comprising two of the adjacent first pins, and in the fourth pin group, a difference of the voltage transmitted between two of the first pins is a fourth difference, wherein the third difference is less than the fourth difference; and a space between two of the first pins in the third pin group is smaller than a space between two of the first pins in the fourth pin group.

4. The pin connector as claimed in claim 1, wherein the pins comprise:

a fifth pin group comprising two of the adjacent second pins, and in the fifth pin group, a difference of the voltage transmitted between two of the second pins is a fifth difference;

a sixth pin group comprising two of the adjacent second pins, and in the sixth pin group, a difference of the voltage transmitted between two of the second pins is a sixth difference, wherein the fifth difference is less than the sixth difference; and a space between two of the second pins in the fifth pin group is smaller than a space between two of the second pins in the sixth pin group.

5. The pin connector as claimed in claim 1, wherein the pins comprise:

a non-functional pin for floating; and a functional pin for transmitting voltage, and other ones of the buffer areas are provided with at least one of the non-functional pin and the functional pin.

6. A display panel, comprising a terminal area, wherein a plurality of terminals are provided in the terminal area, the terminals are arranged along a second direction, and the terminals comprise:

one or more first terminals each for transmitting a first terminal voltage;

one or more second terminals each for transmitting a second terminal voltage, and the first terminal voltage is lower than the second terminal voltage;

in the second direction, each of ones of the one or more first terminals is adjacent to a corresponding one of the one or more second terminals, a space between each of the ones of the one or more first terminals and the corresponding one of the one or more second terminals is not smaller than a size of three of the terminals;

in the second direction, a plurality of terminal buffer areas arranged continuously are formed between the first terminal and the second terminal, and each of ones of the plurality of buffer areas is not provided with one of the pins.

7. The display panel as claimed in claim 6, the terminals comprise:

a first terminal group comprising the adjacent first terminal and the second terminal, and in the first terminal group, a difference between the voltage transmitted by the first terminal and the voltage transmitted by the second terminal is a seventh difference;

a second terminal group comprising the adjacent first terminal and the second terminal, and in the second terminal group, a difference between the voltage transmitted by the first terminal and the voltage transmitted by the second terminal is an eighth difference, wherein the seventh difference is less than the eighth difference; and a space between the first terminal and the second terminal in the first terminal group is smaller than a space between the first terminal and the second terminal in the second terminal group.

8. The display panel as claimed in claim 6, the terminals comprise:

a third terminal group comprising two of the adjacent first terminals, and in the third terminal group, a difference of the voltage transmitted between two of the first terminals is a ninth difference;

a fourth terminal group comprising two of the adjacent first terminals, and in the fourth terminal group, a difference of the voltage transmitted between two of the adjacent first terminals is a tenth difference, wherein the ninth difference is less than the tenth difference; and a space between two of the first terminals in the third terminal group is smaller than a space between two of the first terminals in the fourth terminal group.

9. The display panel as claimed in claim 6, the terminals comprise:

a fifth terminal group comprising two of the adjacent second terminals, and in the fifth terminal group, a difference of the voltage transmitted between two of the second terminals is an eleventh difference;

a sixth terminal group comprising two of the adjacent second terminals, and in the sixth terminal group, a difference of the voltage transmitted between two of the second terminals is a twelfth difference, wherein the eleventh difference is less than the twelfth difference; and a space between two of the second terminals in the fifth terminal group is smaller than a space between two of the second terminals in the sixth terminal group.

* * * * *